2 Sheets--Sheet 1.

H. MIDDLETON.
Telegraph Registers and Sounders.

No. 153,593. Patented July 28, 1874.

Witnesses.  Inventor.

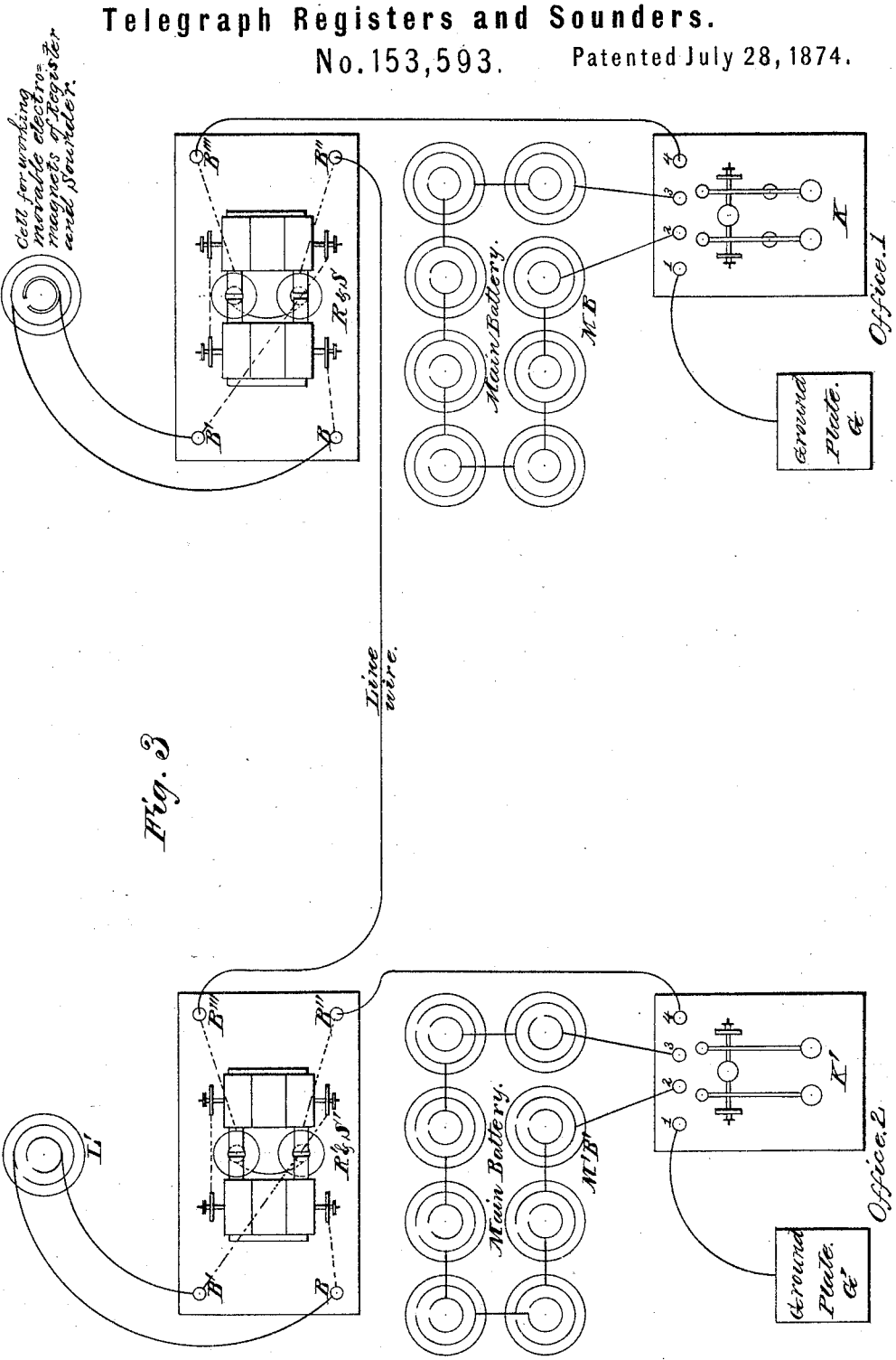

UNITED STATES PATENT OFFICE.

HENRY MIDDLETON, OF CHARLESTON, SOUTH CAROLINA.

IMPROVEMENT IN TELEGRAPH REGISTERS AND SOUNDERS.

Specification forming part of Letters Patent No. 153,593, dated July 28, 1874; application filed February 16, 1874.

*To all whom it may concern:*

Be it known that I, HENRY MIDDLETON, of Charleston, in the county of Charleston and State of South Carolina, have invented new and useful Improvements in Telegraph Registers and Sounders; and I do hereby declare that the following is a full, clear, and exact description thereof, reference being had to the accompanying drawings making part of this specification, in which—

Figure 1:
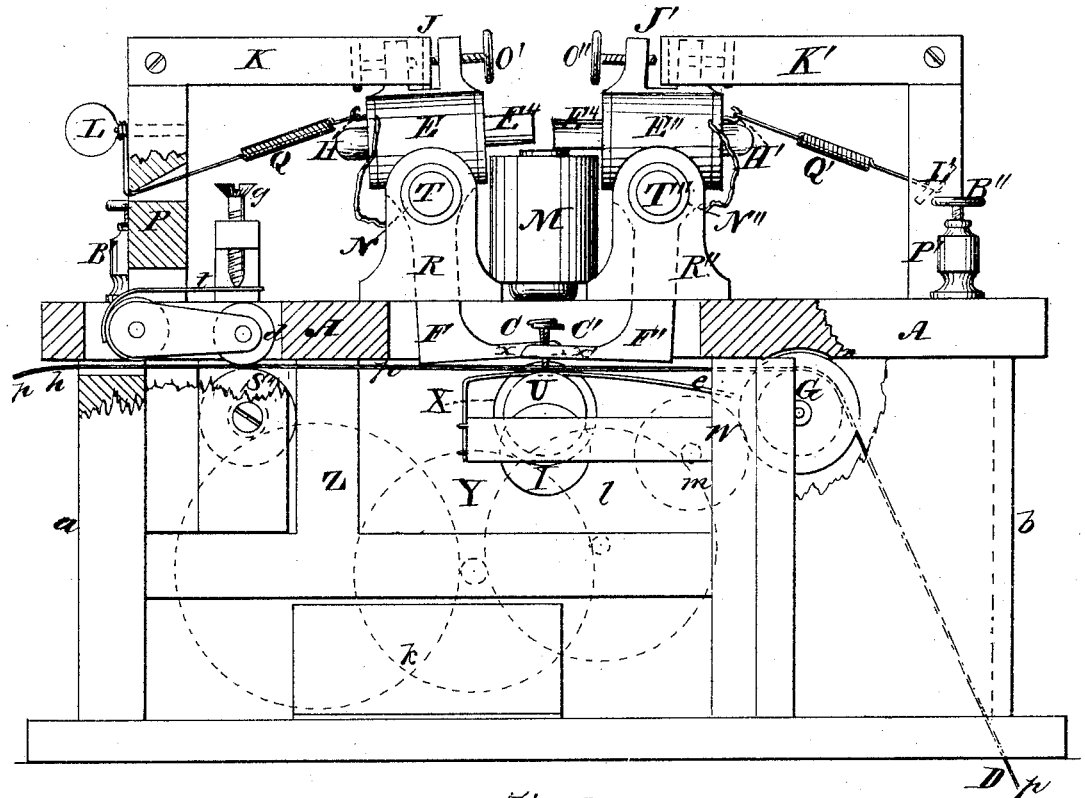
Figure 2:
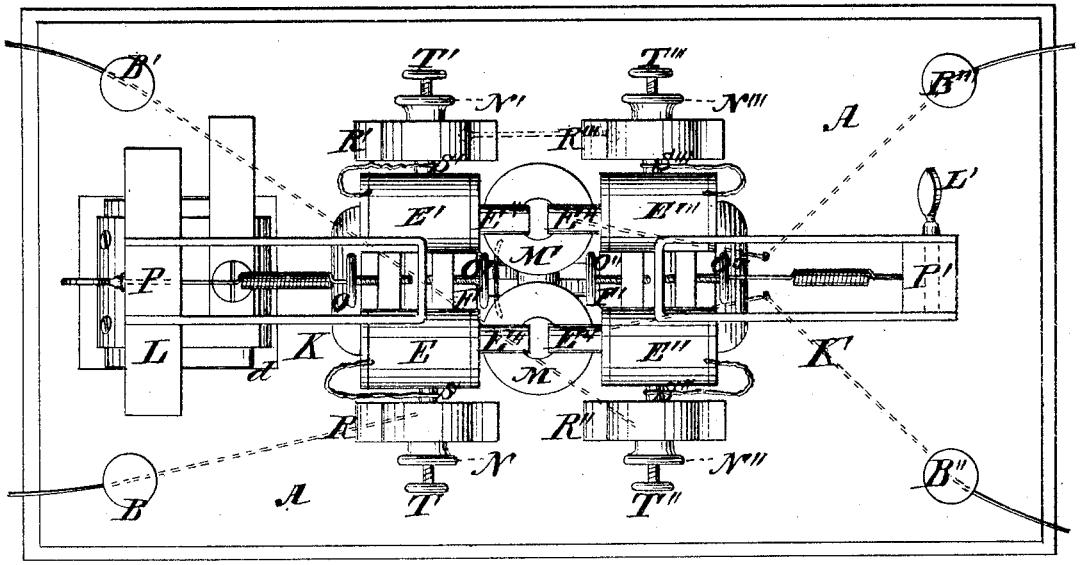

Figure 1 is a side elevation, Fig. 2 a plan, of my register and sounder.

The object of my invention is to improve upon the Morse system of electro-magnetic registers and sounders by introducing a machine or instrument so devised and constructed that voltaic forces or "currents" acting or "flowing" in certain given directions, reversed or entirely discontinued, will be so utilized and rendered available that a greater amount and variety of sounds, signs, characters, or other marks (capable of being recognized either by the ear or eye) can be made and recorded than in the instrument now in use.

I would here say that there are two batteries used for working my sounder and register. The first a main-line battery or collection of cells for working the stationary electro-magnet, (M M' in the drawings;) the second a small local battery (usually a single cell is sufficient) for rendering active the movable electro-magnets E E' and E'' E''' of my register and sounder.

The circuit of this second battery is constant, and comprises the two electro-magnets E E' and E'' E''', and nothing more. The consequence is that these movable electro-magnets E E' and E'' E''' are permanent magnets, and their battery connections are so arranged that their opposite poles are turned toward each other.

The circuit of the main battery, which includes the stationary magnet M M' with key, &c., is variable and closed by depressing one or the other of the levers of the key.

By my invention I am enabled to use movable permanent magnets, or those whose poles are constant, both in name and strength, in combination with an immovable electro-magnet capable of being magnetized and demagnetized, and whose poles are variable and can be interchanged—that is, a north pole taking the place of a south pole, and a south pole taking the place of a north pole, at the will of the operator, in order that, by the magnetization of this stationary magnet, one of these movable magnets, as E E', will be attracted to the stationary magnet M M', and the other movable electro-magnet, E'' E''', repelled from the stationary magnet M M', or the reverse, according to the direction of the electric current which is flowing through the coils of the stationary electro-magnet M M', the object and end of the whole arrangement being manifestly to enable the movements of the movable magnets to indicate the direction of the currents in the coils of the stationary magnet; and since the direction of these currents in the stationary magnet is controlled by the operator at the distant station (or the operator sending the message) and expresses certain signs, the movements of these movable magnets indicate these signs to the operator at the near station (or the one receiving the message.)

Furthermore, by the duration of the period that one or the other of the two key-levers is pressed down, a dot or a dash is printed and sounded by the registering and sounding parts of the instrument, respectively, and since the dot and dash made by depressing one lever of the key are differently represented from the dot and dash represented by the other lever of the key, therefore four (4) different signs (instead of the two of the Morse system) can be expressed, and consequently used in the formation of an alphabet.

A A is a flat supporting-piece, made of wood, glass, or other non-conducting material, to which is fastened the electro-magnet M M', with the outside ends of its wire coils connected with the binding-posts B'' B''', and the inside ends of the coils connected together. E E' and E'' E''' are two horseshoe electro-magnets set in frames F F', either of brass, vulcanite, wood, or other material, which frames have driven into them, at suitable points, the shafts S S' S'' S''', (see Fig. 2,) upon which they turn. Each shaft is made of brass or other good conductor and insulated from its contiguous shaft.

If the frames F F' are made of metal or other conducting substance, the shafts are insulated (as by a piece or pocket of vulcanite) from the frames. These shafts turn in the hollowed-out ends of the brass thumb-screws T, T', T'', and T''', which thumb-screws pass through the ears R, R', R'', and R''', and the nuts N, N', N'', and N''' to support and adjust the shafts. These ears R, R', R'', and R''' are made of brass, and are held in position by screws passing upward through the supporting-stand A A. At the upper ends of the frames F F' are cut the jaws J and J', while the extent of motion of the magnet-frames is regulated by set-screws O, O', O'', and O''' with milled heads. These screws strike against the sounding-pieces K K'. The lower part of the frame F and F' is shaped into a bend or foot, $x\ x'$, and each of these feet has a lateral bend or portion cut out to prevent the interference of the one with the other. Near the end of each foot is placed a screw with a milled head, C C', the milled head being either above or below the foot, as is found convenient for adjustment.

The electro-magnets E, E', E'', and E''' have their soft-iron cores $E^4$ projecting some distance in front of their coils, in order to bring their poles over the poles of the magnets M M', and I intend, if need be, to use two movable permanent bar or horseshoe magnets with their unlike poles turned toward each other, and placed over the immovable electro-magnet, in lieu of the two movable electro-magnets E E' and E'' E'''. The lower parts of the cylindrical surfaces of the cores which project beyond the coils E, E', E'', and E''' may be flattened as represented, if found convenient.

The wire ends of the coils E, E', E'', and E''' are connected in the following manner: The end of the wire forming the outside of the coil E is connected with the shaft S. The end of the wire forming the inside of the coil E is connected with the end of the wire forming the inside of the coil E', and the outside end of the coil E' is connected with the shaft S'. The outside end of the coil E'' is connected with the shaft S''. The inside end of the coil E'' is connected with the inside end of the coil E''', and the outside end of E''' is connected with the shaft S'''. The head of one of the screws holding on the ear R is electrically connected, by means of a wire, with the binding-post B. The head of one of the screws holding on the ear R' is connected electrically, by a wire, with one of the screws holding on the ear R''', and one of the screws in R'' is connected electrically with the binding-post B'. These connections are so made that there may be electrical communication through the binding-post B, the wire connecting the binding-post B with the ear R, through the ear R, the thumb-screw T, the shaft S, the coils of the electro-magnet E E', the shaft S', the thumb-screw T', through the ear R'; then through the wire electrically connecting the ear R' with the ear R''', through the ear R''', the thumb-screw T''', the shaft S''', the coils of the electro-magnet E''' E'', the shaft S'', the thumb-screw T'', the ear R'', and through the wire connecting the ear R'' with the binding-post B'. At the back of each of the magnets E E' and E'' E''' is a small hook, H and H', Fig. 1. The posts P and P' are placed at convenient points on the supporting-piece A A. To the upper part of each post is fastened a sounding-piece. K and K' represent these sounding-pieces, which are formed of pieces of unlike metal, and so constructed that, when struck by the set-screws O, O', O'', and O''', they may emit different sounds. L and L' are two adjusting-screws passing through the posts P and P', for the purpose of regulating the tension of the springs Q and Q' attached to the hooks H and H' at the back of the magnets E E' and E'' E'''. The post P is made somewhat like an inverted Y, the branches of the Y being parallel to, or facing the plane of the arms of, the electro-magnet M M'. The object of making the post P in this manner is to enable it to straddle the jockey-roller $d$ below it.

In Fig. 1 the outside leg of the post P is represented as removed to show the machinery behind it. Below the supporting-piece A A is placed the clock-work to be used when it is desired to register the movements of the magnets. Z is a driving-wheel concealing and connected with a spring behind it, which is wound up by turning an arbor passing through it. By a pinion the motion of Z is communicated to Y, and from Y to X, which bears on the front of its arbor the two wheels U and V, (U only being shown in the elevation, Fig. 1, and V being exactly behind it and of the same size.) The distance between the wheels is such that they may come, respectively, vertically under one of the set-screws $c$ and $c'$, in the drawing. The wheels U and V are kept constantly moist by turning in the inking-saucer I, which has a partition across its middle, so that inks of two different colors may be used for wetting the wheels. The ink-saucer is supported by the piece W. The wheel Y drives a pinion, on the arbor of which is placed the wheel $l$, which wheel drives in the same manner the escapement-wheel $m$, to which the usual machinery for regulating clock-work can be attached. Under the box containing the clock-work is placed another box (not shown in the drawing) for containing a horizontal wheel for paper, and its gearing such as was first introduced by Stroh. The paper $p$ from this wheel passes upward through an opening, D, in the bottom of the clock-work box, thence over the guide-roller G and below the set screws $c$ and $c'$ and above the wheels U and V, but prevented from touching them by the wire $e$ when the magnets E E' and E'' E''' are not working; but when either of these magnets is attracted the paper is tilted to the one side or the other of the wire $e$, as the case may be, by being pressed down by one of the set screws $c$ or $c'$ of the frame F F', so as to bring the paper in contact with one of the inking-wheels U or V, when it receives a character colored according to the ink in which the printing-wheel or roller is turning. The paper $p$ is pulled forward by passing between the roller S and the jockey-roller $d$. The roller S receives its motion through a pinion on its arbor, driven by the wheel Z. Over the roller S is placed a jockey-roller, $d$, which turns by the friction of the paper passing between it and the roller S. The pressure of the jockey-roller is regulated by the spring $t$ and set-screw $g$, as shown. At $h$, in the end $a$ of the clock-work box, is an opening through which the paper is delivered with the message printed on it. A mirror, $k$, is placed in the bottom of the clock-work box, and set therein at such an angle that an operator can easily see what is written on the paper strip $p$, after it has been marked by the inking-wheels U and V, before the paper strip leaves the clock-work box. The advantage to be gained by such application of the mirror is as follows: First, that if a mistake occurs while a message is being transmitted, the operator receiving the message can break the current at the instant (or very soon after) the mistake occurs, without waiting, in ignorance of the error, until the part of the paper on which the error is recorded passes out of the aperture at which the paper strip leaves the clock-work box. This facility of being able instantly to get any error corrected is considered a great advantage among telegraph operators; second, as the paper is printed on the under side, an operator would have to wait until it came out of the clock-work box, and then turn it over in order to read the message, if the mirror $k$ were removed; while with the mirror an operator has only to watch the characters seen in the mirror, and write them on his office-blank as fast as they appear, the result being a saving of time and trouble. Third, if no mirror were used each time a message was sent about six inches of paper strip would be wasted, for the clock-work could not be stopped until after the last part of the message printed on the paper came out of the clock-work box, and when again the clock-work was started to record a new message the beginning of that message would occur after a blank in the paper unless one message were sent immediately after the other by the operator at the distant station.

The method of operating my telegraph register and sounder is as follows: A small voltaic battery (generally a single cell is sufficient) has its poles connected, respectively, with the binding-posts B and B' of my register and sounder. (See Figs. 1, 2, and 3.) The binding-posts B'' and B''' are connected as shown in Fig. 3—one with the line and the other with the key K—while the binding-posts 2 and 3 of the key K are connected, respectively, to the opposite poles of a main battery, M B. The binding-post 1 of the key K is connected with the ground-plate. This constitutes the equipment of one office, and the other office is arranged in like manner, as shown in Fig. 3. When the right-hand lever of the key K is depressed, a current of positive electricity passes from the positive pole of the main battery M B, through certain wire connections under the key-board of the key K', the coils of the stationary magnet of the sounder R and S, the line-wire, the coils of the stationary magnet of the register and sounder R' and S', the key K', the ground-plate G', the earth, the ground-plate G, through the wire connections under the key-board K, to the negative pole of the main battery M B. Immediately upon the establishment of this circuit both the stationary magnets of the registers and sounders R and S and R' and S' are rendered magnetic, and attract one, say, the right-hand one, of the movable magnets of those registers and sounders R and S and R' and S', in Fig. 3. If, now, the left-hand lever of the key K is depressed, the positive current will pass in the opposite direction to the one supposed, through the registers and sounders R and S and R' and S' of my telegraph-line, and the consequence is that the the opposite movable electro-magnets to the one supposed, say, the left-hand one, will be attracted.

Thus, to signal from office 1 to office 2, the key at office 1 and the main battery M B at office 1 are used; while to signal from office 2 to office 1, the key at 2 and main battery M' B' at office 2 are used. Moreover, the circuit of each main battery is broken, except when the keys are depressed, and thus the battery material is only used when a message is sent.

Having thus described my invention, what I claim as new, and desire to secure by Letters Patent of the United States, is—

1. In a telegraph register and sounder, two movable electro-magnets, arranged to have their unlike poles turned toward each other, in combination with an immovable electro-magnet, substantially as described.

2. The movable electro-magnets E E' and E'' E''', constructed with projecting soft-iron cores, the ends of which are arranged to operate over the ends of the soft-iron cores of the electro-magnet M M', substantially as described.

3. In a telegraph register and sounder, movble permanent electro-magnets, in combination with sounding-pieces made of unlike metal, constructed and arranged substantially as and for the purpose described.

4. The sounders K K', the frame F F', and the movable electro-magnets E E' and E'' E''', in combination with the wheels U and V, by means of which the sounds produced through the movements of the magnets are simultaneously signified by marks made on the paper during its passage through the machine, substantially as described.

HENRY MIDDLETON.

Witnesses:
W. ALSTON PRINGLE,
HENRY A. M. SMITH.